March 25, 1930.  F. G. PARKER  1,752,024
ANTISKID DEVICE
Original Filed April 20, 1926  2 Sheets-Sheet 1
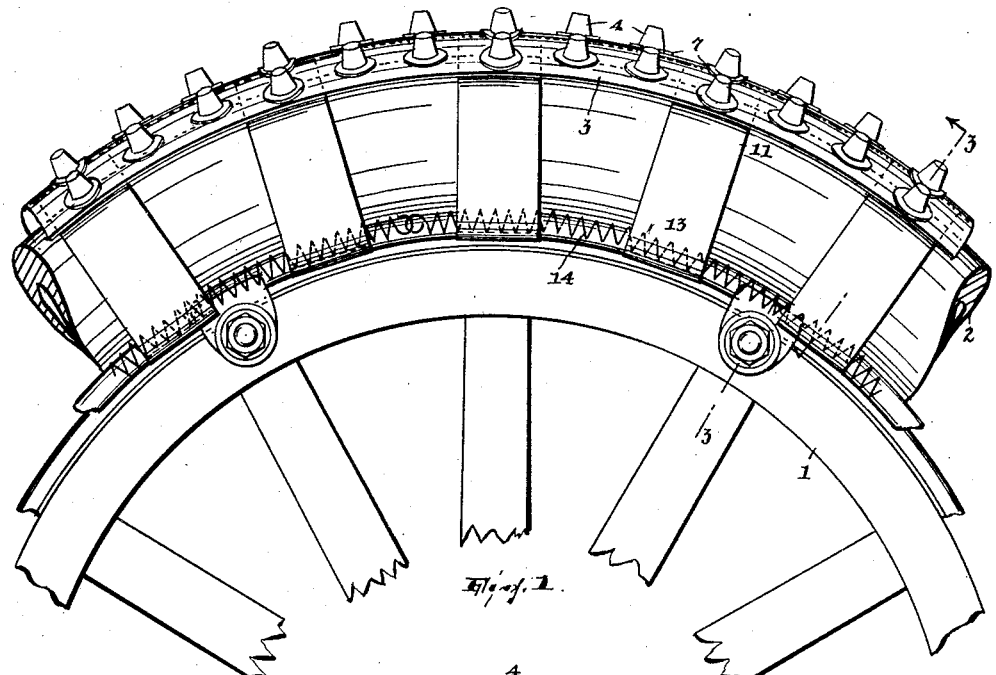
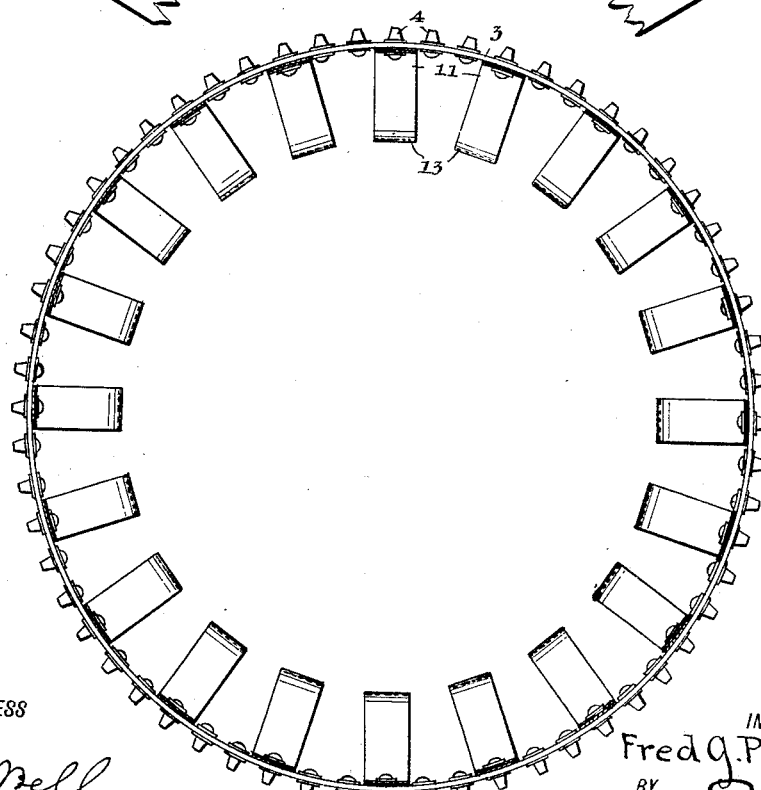

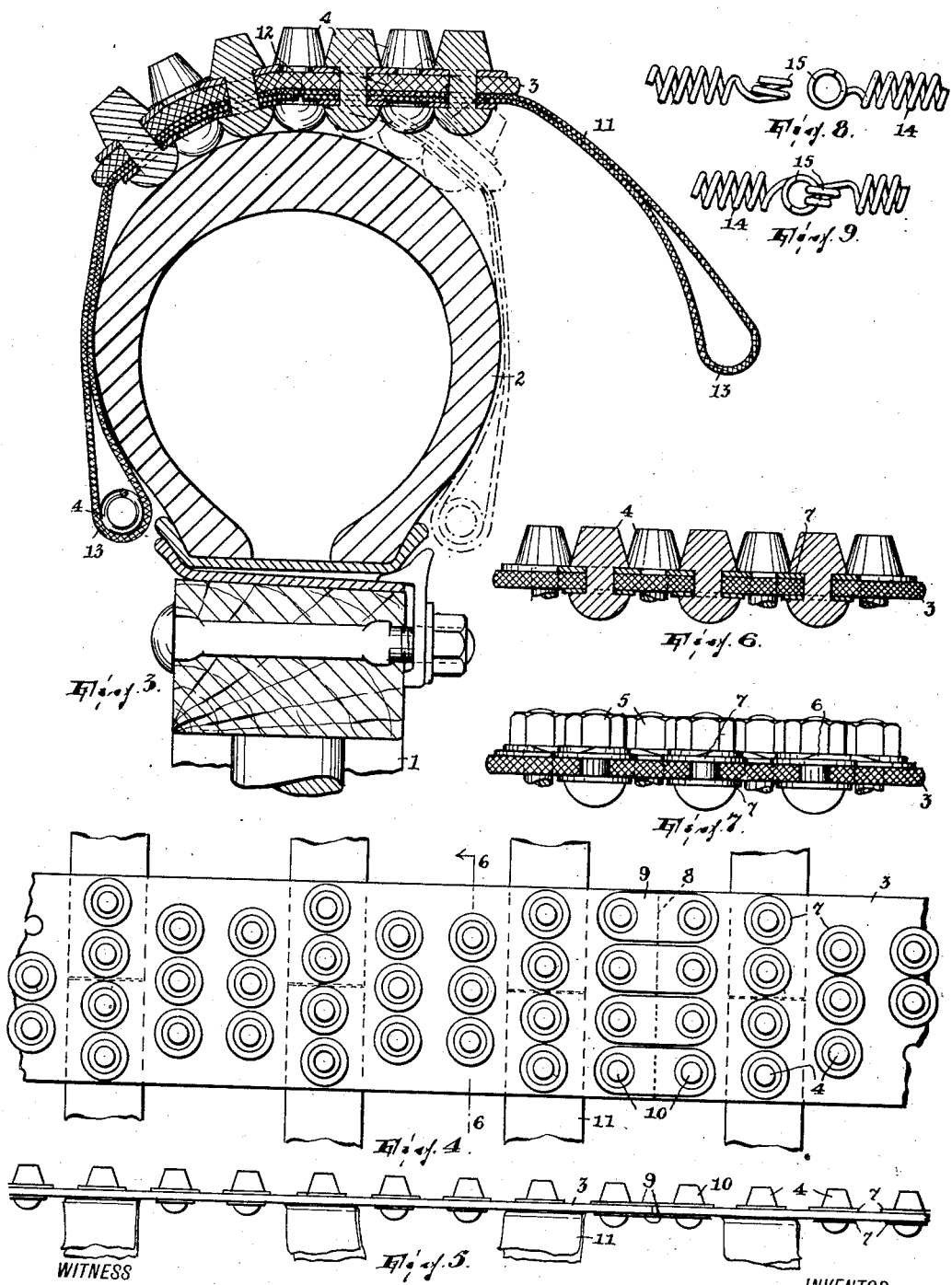

Patented Mar. 25, 1930

1,752,024

UNITED STATES PATENT OFFICE

FRED G. PARKER, OF PATERSON, NEW JERSEY

ANTISKID DEVICE

Application filed April 20, 1926, Serial No. 103,271. Renewed January 13, 1928.

This invention relates to anti-skid and tire protecting devices or shoes for vehicle wheels and its principal object is to provide a device of this class which will afford a more effective traction than those of the ordinary chain type, will avoid the noise and wear of the tire that attends the use of and present a better appearance than devices of the chain type, and which may be more readily fitted to and removed from the wheel. To this end my device is constructed as a stiff endless flexible band to embrace, circumferentially, the tire tread, being usually studded or otherwise roughened to give it the anti-skid quality, the same embodying a circumferential mid-portion or tread-portion and as to either marginal portion having the same normally assuming a position in substantial cylindrical extension of said mid- or tread-portion but yieldable to force applied in a way to deform such marginal portion by contracting it. Conceiving that the application of such a device to or its removal from a wheel is most easily performed by a movement lengthwise of the axis of the wheel, with the latter jacked off the ground, my object in forming the band as stated—with the marginal portion tending to assume a position in substantial cylindrical extension of the mid- or thread-portion of the band—is still further to facilitate the operation; when the device is in use the marginal portion will be contracted by suitable means, but when this means is caused to release said portion the device is capable of being most readily slipped onto or off of the wheel. In practice both marginal portions are preferably alike so that the device is reversible. I know it is not new to provide bands for anti-skid devices or tire protectors; but so far as I am aware it has never been proposed to provide an endless vehicle wheel tire shoe including a stiff flexible band formed to approximately wholly embrace the tire and embodying a circumferential tread portion and having a marginal portion normally assuming a position in cylindrical extension of said tread portion but yieldable radially inwardly, in combination with means to deform said marginal portion to a less diameter than the tread portion; if in the known construction the band was split and not endless the necessity of manipulating the incidental joint in applying or removing the device was troublesome, especially if in cross-section it had or tended to assume an arched form.

In the accompanying drawings,

Fig. 1 is a fragmentary side elevation of an automobile wheel having my device applied thereto;

Fig. 2 is a view on a smaller scale and in side elevation, partly in section, showing my device detached and the contracting or deforming means therefor removed;

Fig. 3 is a section on line 3—3, Fig. 1;

Figs. 4 and 5 are a plan and a side elevation of a fragment of the device;

Fig. 6 is a sectional view on the line 6—6, Fig. 4, and Fig. 7 is a similar view of a modification; and Figs. 8 and 9 are elevations from two different points of view of the joint portion of the deforming means, where, as shown, the same is a spring.

The numeral 1 designates a wheel of which the part 2 may be an ordinary pneumatic rubber tire.

The body part 3 of my device may be composed of a strip of strong, durable fabric, as duck of proper thickness, and if it is a fabric it may well have incorporated in it a vulcanized rubber composition, after the manner of forming automobile tires, so as to give it great strength and durability and also the necessary stiffness. This body part is in the example made endless and has the form of a cylinder—or to state it otherwise, it is without substantial arching in cross-section in its normal condition; it is, however, in so far tractable that when sufficient force is applied it may be flexed, although it will return to substantially its normal position upon removal of the force.

Usually to protect this body 3 against road-wear and also to increase its tractive action it will be provided with suitable calks or otherwise studded or roughened. In Fig. 6 I show this body studded with rivets 4 and in Fig. 7 with calks 5 of the bolt-and-nut type, the nuts thereof being preferably locked by spring lock-washers 6. For reenforcing the body 3 where it is penetrated as shown by each element 4 (or 5) and to prevent their loosening and falling away I provide on both sides of it, penetrated by each such device, the metal washers 7. The grouping or arrangement of the elements 4 or 5 is entirely arbitrary.

I have said that the band is endless. This is so in the sense that it is normally endless: in the example shown it is permanently so because the body 3 of the band is formed from a strip having its ends butt-jointed as in Fig. 4 at 8 and permanently joined together by elongated metal washers or couplings 9, inside and outside, which are bound to the body 3 by calk elements 10 which penetrate the parts 9 and said body.

Attaching loops project from both margins of the band at regular intervals, being formed and secured thereto in the present example as follows: The loops are formed by a strap 11 having its ends rebent upon itself and abutting as at 12 in Fig. 3. This strap lies against the inner side of the band and is secured thereto by a row of the calking elements 4 or 5 in such manner that each looped end thereof projects beyond a margin of the band. This strap may be also of fabric having vulcanized rubber incorporated therein.

All of the loops 13 on each side of the wheel, after my device is in place thereon as shown in Figs. 1 and 3, are adapted to be drawn and held radially inward. This may be accomplished by any means, but I prefer to use a constricting means. This in the present case is a heavy spiral spring 14, (Figs. 1, 8 and 9). Each said spring is passed through the loops on one side of the wheel and its ends are thereupon drawn together and connected with each other; the operation of thus tautening the spring results in the marginal portion of the band being inwardly deformed and so reduced in diameter as shown at the left, Fig. 3, by solid lines, and at the right by dotted lines. As a convenient joint for the ends of each spring I form said ends as spirals 15 whose axes are perpendicular or otherwise at an angle to the spiral-axis of the spring itself, the spirals 15 having their coils spaced in a manner to permit one spiral to be hooked into the other as shown in Fig. 9.

In fitting the shoe to or removing it from the wheel the vehicle will be jacked up so as to elevate the wheel from the ground. The means for drawing the loops 13 radially inward will at that time be made inactive (at least that one of such means which is at the relatively inner side of the band), and since the band as to the marginal portion affected is thus released and so assumes a position in cylindrical extension of the circumferential mid- or tread-portion of the shoe (Fig. 3), the slipping on or off of the shoe is accomplished with perfect facility. It is of course assumed that the tread portion of the device when in place on the wheel fairly snugly fits the tread of the wheel, and that its marginal portions project laterally with respect to said tread so that when the deforming means is operating on them their diameter is less than that of the tread whereby the shoe is held against lateral displacement off the wheel.

Having thus fully described my invention what I claim and desire to secure by Letters Patent is:

An endless vehicle wheel tire shoe including a stiff flexible band formed to approximately wholly embrace the tire and embodying a circumferential tread-portion and having a marginal portion normally assuming a position in cylindrical extension of said tread portion but yieldable radially inward, in combination with means to deform said marginal portion to a less diameter than the tread portion, whereby when the shoe is applied over a wheel whose tread said tread-portion closely fits and said means thereupon is made to contract the marginal portion to a less diameter than that of the wheel tread said shoe will be held against displacement off the wheel laterally thereof in one direction.

In testimony whereof I affix my signature.

FRED G. PARKER.